(12) United States Patent
Ooka

(10) Patent No.: US 8,818,714 B2
(45) Date of Patent: Aug. 26, 2014

(54) PORTABLE NAVIGATION DEVICE AND METHOD WITH ACTIVE ELEMENTS

(75) Inventor: Tatsuya Ooka, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 13/208,473

(22) Filed: Aug. 12, 2011

(65) Prior Publication Data

US 2012/0150431 A1  Jun. 14, 2012

Related U.S. Application Data

(60) Provisional application No. 61/421,651, filed on Dec. 10, 2010.

(51) Int. Cl.
*G01C 21/36* (2006.01)

(52) U.S. Cl.
CPC .................................. *G01C 21/3652* (2013.01)
USPC ............................ 701/425; 701/409; 701/526

(58) Field of Classification Search
CPC .... G01C 21/00; G01C 21/34; G01C 21/3629; G01C 21/20; H04B 3/36; G06F 3/041
USPC ......... 701/408, 420, 425, 432, 433, 469, 472, 701/526; 340/407.2, 686.1, 407.1; 342/357.52; 345/173
See application file for complete search history.

(56) References Cited

U.S. PATENT DOCUMENTS

| | | | |
|---|---|---|---|
| 6,259,990 B1 * | 7/2001 | Shojima et al. | 701/420 |
| 6,546,336 B1 * | 4/2003 | Matsuoka et al. | 701/472 |
| 6,839,626 B2 * | 1/2005 | Yamakita et al. | 701/433 |
| 7,539,576 B2 * | 5/2009 | Ohnishi et al. | 701/433 |
| 7,756,636 B2 * | 7/2010 | Kikuchi et al. | 701/420 |
| 8,204,684 B2 * | 6/2012 | Forstall et al. | 701/433 |
| 8,244,460 B2 * | 8/2012 | Kubota et al. | 701/408 |
| 8,296,062 B2 * | 10/2012 | Yamane et al. | 701/432 |
| 2002/0111737 A1 * | 8/2002 | Hoisko | 701/209 |

(Continued)

FOREIGN PATENT DOCUMENTS

| | | |
|---|---|---|
| CN | 1774614 A | 5/2006 |
| CN | 101097140 A | 1/2008 |

(Continued)

OTHER PUBLICATIONS

U.S. Appl. No. 13/708,010, filed Dec. 7, 2012, Ooka.

(Continued)

*Primary Examiner* — Tuan C. To
*Assistant Examiner* — Yuri Kan
(74) *Attorney, Agent, or Firm* — Oblon, Spivak, McClelland, Maier & Neustadt, L.L.P.

(57) ABSTRACT

A portable navigation device and method are capable of presenting a destination direction to a user without resorting to visual sensation with a relatively simple configuration. Vibration elements are disposed on or in different positions of a housing. The respective vibration intensities of the vibration elements are determined on the basis of an angular difference θ between a destination direction Vn and a terminal direction Vd. The vibration elements are respectively controlled in accordance with the determined vibration intensities. The position of a vibration, which is obtained as a result of blending vibrations of the vibration elements is sensed by a user.

21 Claims, 13 Drawing Sheets

(56) References Cited

U.S. PATENT DOCUMENTS

| | | | |
|---|---|---|---|
| 2002/0128765 A1* | 9/2002 | Cato et al. | 701/200 |
| 2004/0128069 A1* | 7/2004 | Cato et al. | 701/209 |
| 2006/0178827 A1* | 8/2006 | Aoyama | 701/211 |
| 2006/0184318 A1* | 8/2006 | Yoshimine | 701/209 |
| 2006/0190168 A1* | 8/2006 | Ohnishi et al. | 701/211 |
| 2006/0229809 A1* | 10/2006 | Chen | 701/213 |
| 2007/0268178 A1* | 11/2007 | Jung et al. | 342/357.06 |
| 2008/0120029 A1* | 5/2008 | Zelek et al. | 701/213 |
| 2008/0180267 A1* | 7/2008 | Kaneko et al. | 340/686.1 |
| 2010/0060604 A1* | 3/2010 | Zwart et al. | 345/173 |
| 2011/0025480 A1* | 2/2011 | Hwang et al. | 340/407.1 |
| 2012/0150431 A1* | 6/2012 | Ooka | 701/425 |
| 2012/0242465 A1* | 9/2012 | Murata et al. | 340/407.2 |

FOREIGN PATENT DOCUMENTS

| | | |
|---|---|---|
| CN | 101256082 A | 9/2008 |
| CN | 101315281 A | 12/2008 |
| JP | 2001-025510 A | 1/2001 |
| JP | 2002-168647 A | 6/2002 |
| JP | 2003-083762 A | 3/2003 |
| JP | 2005-241385 A | 9/2005 |
| JP | 2008-180652 A | 8/2008 |
| JP | 2008-286546 A | 11/2008 |

OTHER PUBLICATIONS

U.S. Appl. No. 13/705,469, filed Dec. 5, 2012, Ooka.

Combined Chinese Office Action and Search Report issued Dec. 19, 2013 in Patent Application No. 201110328310.2 (with English language translation).

European Search Report issued Apr. 11, 2014, in European Patent Application No. 11177937.7, pp. 1-11.

* cited by examiner

PORTABLE NAVIGATION DEVICE AND METHOD WITH ACTIVE ELEMENTS

CROSS REFERENCE TO RELATED APPLICATIONS

This application is related to and claims priority under 35 U.S.C. §119(e) to Provisional Application Ser. No. 61/421,651, filed Dec. 10, 2010, the contents of which are hereby incorporated herein by reference.

TECHNICAL FIELD

The present invention relates to a portable navigation device and method that helps a user navigate while traveling (mainly walking) with the user holding a housing of the device.

Background Art

In recent years, car navigation systems that present a route to a destination to a passenger of a vehicle utilizing a GPS (Global Positioning System) for assistance in arriving at the destination have been widely used.

Meanwhile, maps are commonly used to navigate a pedestrian in the related art. In recent years, cellular phones have been widely used, and navigation systems that display map information or the like on a screen of a portable terminal to guide a pedestrian have been put into practical use.

As such navigation systems for a pedestrian that use a portable terminal, PTL 1 and 2 each propose a destination guiding device. In the destination guiding devices, when a user of a cellular phone terminal travels to a destination, the travel direction to the destination with reference to the current position of the user is displayed by an arrow or the like on a screen of the cellular phone terminal.

In the case where the user only relies on an instruction displayed on the screen to recognize the direction of the destination, the user is obliged to fix his or her eyes on a map on the screen while walking. Dependence on visual sensation may make the user careless in looking ahead and around, which can cause danger to the user. That is, if the user walks (or even drives) while staring at the map displayed on the screen, the user may be involved in a traffic accident or cause trouble to other pedestrians.

In order to address such issues, technologies for guiding a direction utilizing tactile stimulation have been proposed. For example, PTL 3 proposes a system that controls a vibrator internal to a portable terminal in accordance with the difference between a destination direction and a travel direction. PTL 4 proposes a direction presentation system that is provided in an electric wheelchair and that presents a destination direction to a user using an actuator that provides tactile stimulation to a finger, a hand, an elbow, or the like of the user.

Citation List

[Patent Literature]

[PTL 1] Japanese Unexamined Patent Application Publication No. 2003-083762

[PTL 2] Japanese Unexamined Patent Application Publication No. 2005-241385

[PTL 3] Japanese Unexamined Patent Application Publication No. 2002-168647

[PTL 4] Japanese Unexamined Patent Application Publication No. 2008-180652

[PTL 5] Japanese Unexamined Patent Application Publication No. 2001-025510

SUMMARY

Technical Problem

The technologies according to the related art that utilize tactile stimulation as a user interface also pose the following issues.

That is, in the case where the terminal according to PTL 3 utilizes vibration to present a direction, the user is merely informed of whether or not the terminal (and hence the user) is oriented in the target direction, through presence or absence of vibration. Therefore, although the user may be informed that he or she is oriented in the destination direction in the case where he or she is oriented in such a direction, otherwise it is necessary for the user to actively explore the destination direction himself or herself by changing the orientation of the terminal. Thus, in practice, an instruction displayed on the screen mainly serves as a user interface for guiding a direction, and vibration only serves assistively.

In the system according to PTL 4, a control device for the actuator itself may be complicated to increase the cost of the device.

The present inventor recognized the limitations of the foregoing background to provide a portable navigation device capable of presenting a destination direction to a user without resorting to visual sensation with a relatively simple configuration.

Exemplary Solution to Problem

In one non-limiting aspect, the present invention uses a vibration PS (phantom sensation), which is one vibration perceiving feature of humans, to present a destination direction. The vibration PS is a phenomenon that when vibration stimulations are applied at a plurality of points on a skin, such vibration stimulations are collectively perceived as a single vibration at an intermediate point, the position of which may be varied by varying the respective vibration intensity ratios of the vibration stimulations. PTL 5, the entire contents of which is incorporated herein by reference, discloses a system that induces a vibration PS using electrical stimulation.

One aspect of the present invention is its utilization of vibration PS, and moves the position of a vibration PS induced in the palm of a user using at least three vibration elements disposed at different positions of a housing of a portable terminal.

According to one exemplary embodiment of a portable navigation device according to the present invention, the device includes: a housing; a current position detecting section that detects a current position; an input section that receives an input of a destination; a destination direction detecting section that detects a destination direction to the destination with the detected current position as a starting point; a terminal direction detecting section that detects an orientation of the housing as a terminal direction; at least three vibration elements disposed at different positions of the housing; an angular difference calculating section that calculates an angular difference between the destination direction and the terminal direction; and a vibration control section that determines respective vibration intensities of the at least three vibration elements on the basis of the calculated angular difference to respectively control the at least three vibration elements in accordance with the determined vibration intensities.

Advantageous Effects

According to an embodiment of the portable navigation device of the present invention, it is possible to present a destination direction to a user holding a terminal through vibration. As a result, it is possible to achieve a smooth and safe navigation system that is intuitive and easy and that does not depend on visual sensation.

DESCRIPTION OF EMBODIMENTS

An embodiment of the present invention will be described in detail below with reference to the drawings. In the embodiment, a portable terminal is illustrated as an example of a portable navigation device.

Figure 1:
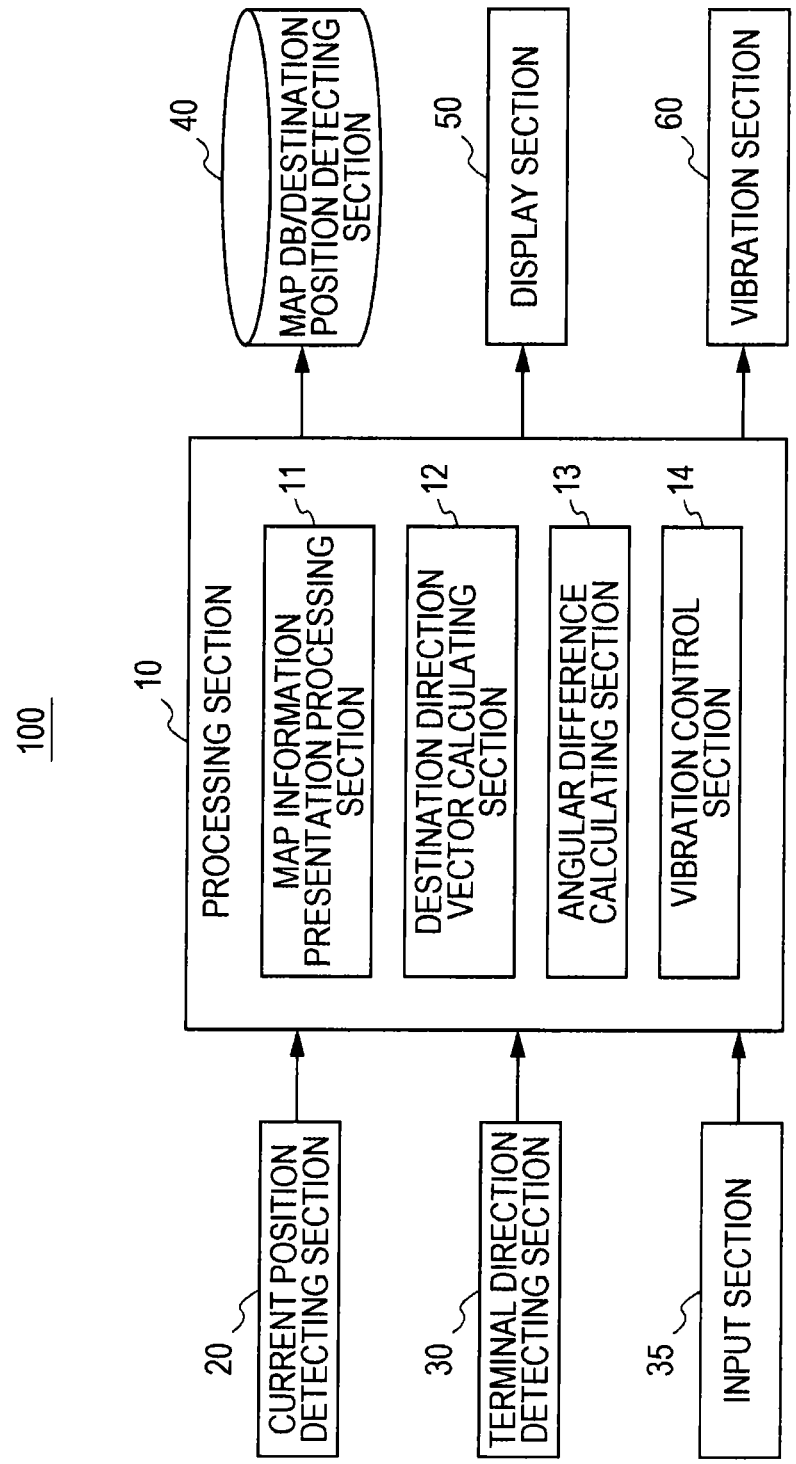
FIG. 1 is a block diagram showing main functions of a portable terminal according to an embodiment.

FIG. 1 is a block diagram showing main functions of the portable terminal according to the embodiment. Hereinafter, the portable terminal may be referred to simply as a terminal.

A portable terminal 100 includes a processing section 10, a current position detecting section 20, a terminal direction detecting section 30, an input section 35, a map database (DB)/destination position detecting section 40, a display section 50, and a vibration section 60.

The processing section 10 includes a central processing unit (CPU), and executes overall control of the portable terminal 100 and necessary processes. For example, the processing section 10 governs overall control of the portable terminal 100 in the case where a navigation start operation is performed. Specifically, the processing section 10 is composed of various functional blocks such as a map information presentation processing section 11, a destination direction vector calculating section 12, an angular difference calculating section 13, and a vibration control section 14. Operations of the various functional blocks will be discussed later.

The current position detecting section 20 detects the current position of the portable terminal 100, that is, the latitude and the longitude of the position of the portable terminal 100 on the earth. As the current position detecting section 20, position detecting means such as a GPS reception section may be utilized. However, the current position detecting section according to the present invention is not limited to the GPS reception section.

The terminal direction detecting section 30 detects a terminal direction Vd which is the direction in which an end of the portable terminal 100 in the longitudinal direction is oriented. Specifically, direction detecting means such as a terrestrial magnetism sensor, for example, may be used to obtain the direction in which an end of the terminal is oriented with respect to a reference direction such as a longitude line (or a latitude line) as the terminal direction Vd. Normally, in the case where a user utilizes the portable terminal 100, he or she holds the portable terminal 100 with the longitudinal direction of its housing slightly inclined from the vertical direction to see a display screen. When guiding a direction through vibration in accordance with the present invention, it is not necessary to see the screen, and thus it is considered that the user may hold the housing horizontally (or nearly horizontally). In any case, the terrestrial magnetism sensor makes it possible to recognize the terminal direction Vd in such states. The terminal direction Vd may be obtained by projecting the actual terminal direction on a horizontal plane in the case where the terminal direction Vd is not on a horizontal plane. In this case, an acceleration sensor may be used to detect the posture of the terminal (inclination of the housing with respect to the vertical direction).

The input section 35 allows the user to input a command or information to the portable terminal 100. The input section 35 may be formed by any input device such as an operation key and a touch panel.

The destination position detecting section 40 detects the position (latitude and longitude), on a map, of a destination selected by the user utilizing a map database. The map database utilized may be either stored in the portable terminal or stored externally and obtained by way of a communication network. In consideration of the need for a storage space (memory capacity) for storing large-sized map data, the necessity to update the map data, and so forth, it is considered practical to utilize the latter option.

The display section 50 is a display device, such as a liquid crystal display device (LCD), that displays information, such as a text and an image, on a display screen. In the embodiment, the display section 50 specifically displays map information for selection of a destination and the direction of the destination as seen from the portable terminal 100.

The vibration section 60 is a device that generates vibration to provide information to the user holding the housing via tactile sensation. In the embodiment, four (at least three) vibration elements are disposed at different positions of the housing (in the embodiment, at the four corners of the housing) of the portable terminal as the vibration section 60 to inform the user of the direction of the destination by driving the vibration elements. The vibration elements basically vibrate at a common predetermined frequency (for example, about 200 Hz). The vibration elements used herein may be any device that generates vibration. The vibration elements may be, but are not specifically limited to, a vibration motor, a piezoelectric element, or a linear actuator, for example.

The various sections of the processing section 10 perform the following processes.

The map information presentation processing section 11 acquires map information from the map DB and displays the map information on the display screen to present the map information to the user for determination of a destination position in the case where the user performs a navigation start operation from the input section 35. Information on the determined destination position is stored in a memory (not shown in FIG. 1).

The destination direction vector calculating section 12 forms a destination direction detecting section that detects a destination direction to the destination with the detected current position as the starting point. Specifically, the destination direction vector calculating section 12 obtains a destination direction vector Vn, on a plane defined by a longitude line and a latitude line, with the current position of the portable terminal 100 as the starting point on the basis of the destination position information stored in the map information presentation processing section 11 and the current position information from the current position detecting section 20.

The angular difference calculating section 13 calculates the difference (angular difference θ) between the angle formed between the destination direction vector Vn calculated by the destination direction vector calculating section 12 and a reference direction (for example, the north direction along a longitude line) and the angle formed between the terminal direction Vd obtained from the terminal direction detecting section 30 and the reference direction. In other words, the angular difference θ is nothing but the angle between the destination direction vector Vn and the terminal direction Vd.

The vibration control section 14 calculates the ratios of the vibration intensities of the vibration elements installed at the four corners of the terminal on the basis of the angular difference θ calculated by the angular difference calculating section 13. The vibration control section 14 also controls driving of the vibration elements in accordance with the vibration intensity ratios. A vibration PS is induced in the palm of the user holding the portable terminal by varying the vibration intensities of the four vibration elements. A specific example of the vibration intensity ratios will be discussed later.

Figure 2:
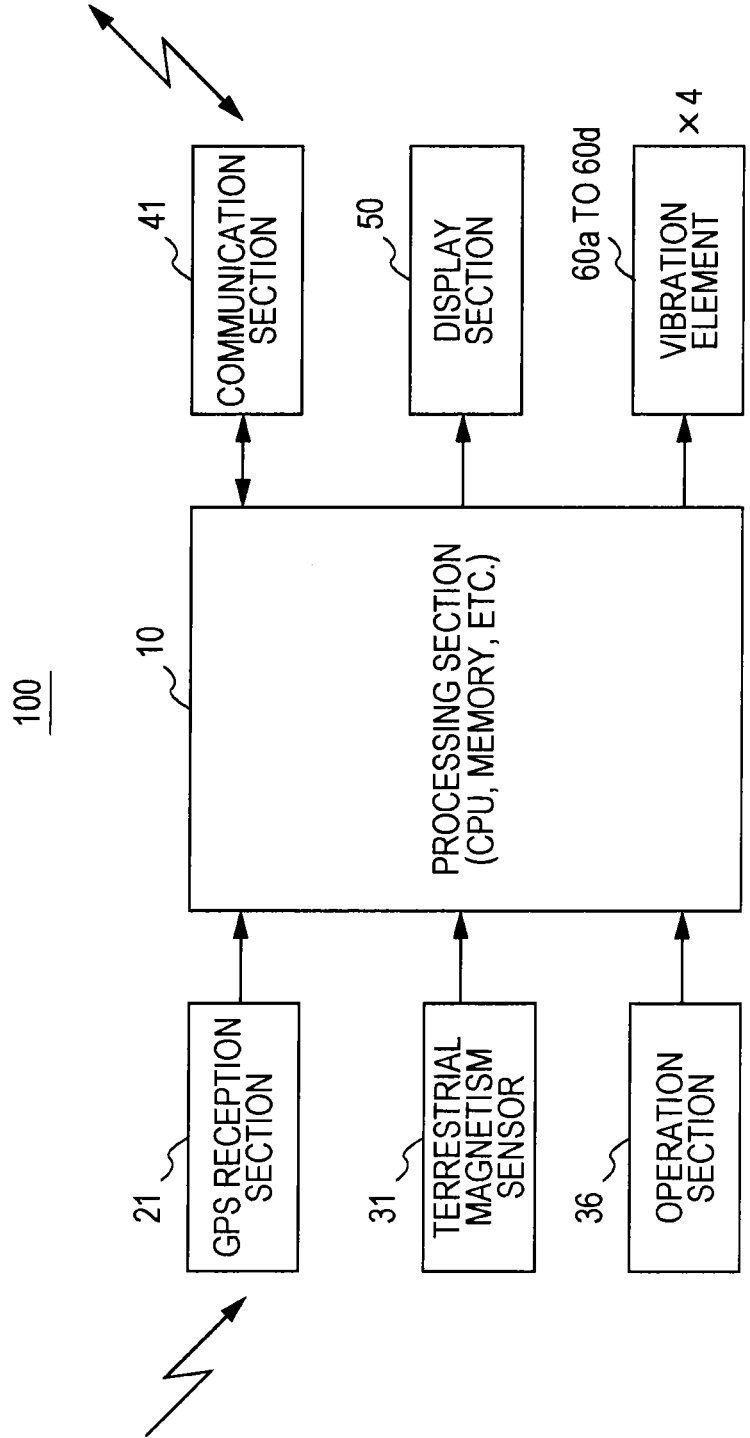
FIG. 2 is a block diagram showing an exemplary hardware configuration of the portable terminal shown in FIG. 1.

FIG. 2 is a block diagram showing an exemplary hardware configuration of the portable terminal 100 shown in FIG. 1. Such a portable terminal configuration can be applied to existing cellular phone terminals.

The processing section 10 is formed by a central processing unit (CPU), a memory, and so forth. The memory stores a program executed by the CPU and various data. The memory is also utilized as a work area for the CPU and an area for temporarily storing the data.

The GPS reception section 21 is an example of the current position detecting section 20, and has a function of receiving radio waves (GPS satellite signals) from a plurality of satellites to detect the current position (latitude and longitude).

The terrestrial magnetism sensor 31 is an example of the terminal direction detecting section 30, and is capable of detecting the direction (for example, the north direction) of terrestrial magnetism at the current position to detect the direction in which the terminal is currently oriented on the basis of the detected direction.

The operation section 36 is an example of the input section 35, and is formed by a plurality of keys such as numeric keys, control keys, and direction indication keys. A touch panel having a touch input area placed over the display screen may be used in addition to or in place of the operation section 36.

The communication section 41 serves to connect with an external communication network such as the Internet, and communication means such as wireless LAN and Bluetooth may be used as the communication section 41 besides a cellular phone communication section. In the case of the configuration of FIG. 2, the map DB of the map DB/destination position detecting section 40 exists on an external communication network, and the destination position is detected by the processing section 10 in cooperation with the operation section 36 and the display section 50 utilizing the map information obtained from the map DB.

Vibration elements 60a to 60d are examples of the vibration section 60, and four vibration elements are included in the example.

The portable terminal 100 may further include constituent elements provided in normal cellular phone terminals, such as a speaker that outputs an audio signal as sound or voice and a microphone that converts sound or voice into an audio signal, although not shown.

Figure 3:
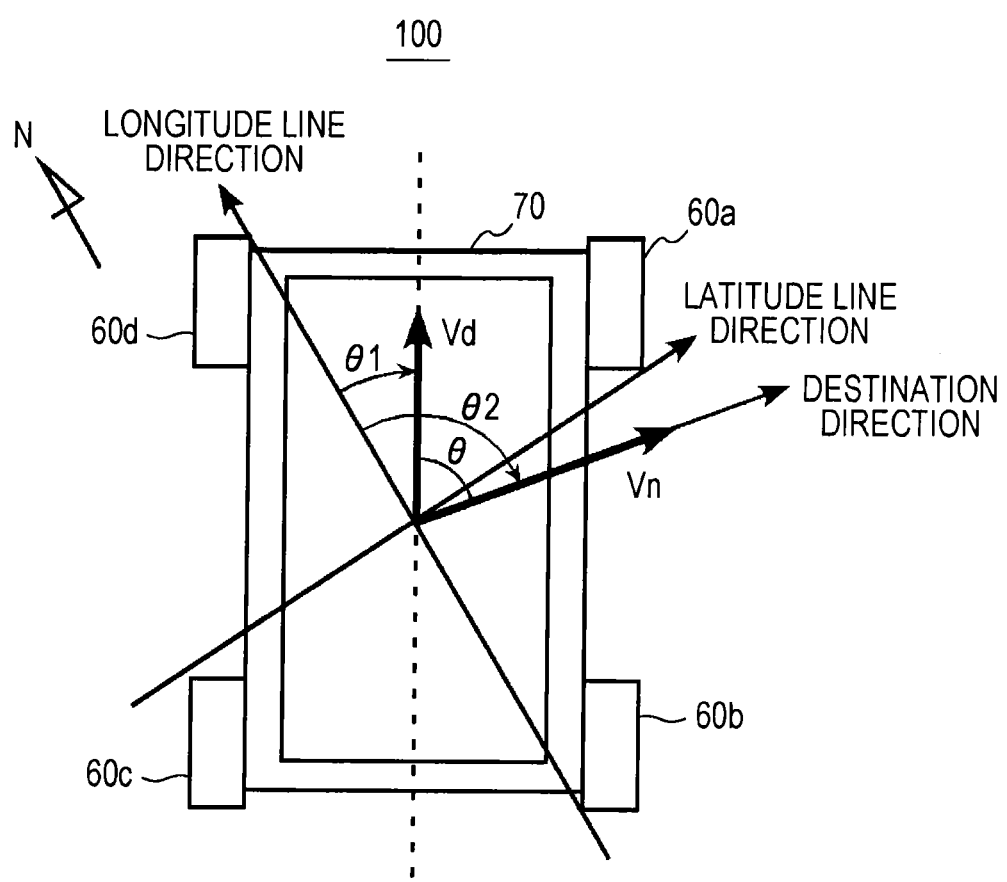
FIG. 3 shows the relationship of the angular difference θ between the orientation of the portable terminal and the destination direction.

FIG. 3 shows the relationship of the angular difference θ between the orientation of the portable terminal 100 (the direction of an end of the portable terminal 100) held by the user and the destination direction. In the drawing, the four vibration elements 60a, 60b, 60c, 60d forming the vibration section 60 are disposed at the four corners of a substantially rectangular parallelepiped housing 70 of the portable terminal. In the drawing, the vibration elements 60a, 60b, 60c, 60d are shown as projecting outward from the housing 70 in an exaggerated manner. In practice, it is not necessary that the vibration elements 60a, 60b, 60c, 60d should project outward as shown.

The destination direction vector Vn is calculated as the direction of the position (latitude and longitude) of the destination determined by the user on the basis of the map database, with the current position (latitude and longitude) obtained from the GPS reception section 21 as the starting point. As discussed above, the angular difference θ is the difference between an angle θ2 formed between the destination direction vector Vn and a longitude line (north direction) and an angle θ1 formed between the terminal direction Vd obtained by the terrestrial magnetism sensor and a longitude line (north direction).

The relationship among the angular difference θ, the vibration intensity ratios of the respective vibration elements, and the position of the vibration PS will be described with reference to FIG. 5.

The vibration intensities V1, V2, V3, V4 of the respective vibration elements are calculated using the angular difference θ by Formula (1) below, for example:

$$v1(\theta) = (1/4) \times \{1 + \sin\theta \sin(\pi/4) + \cos\theta \sin(\pi/4)\}$$

$$v2(\theta) = (1/4) \times \{1 + \sin\theta \sin(\pi/4) - \cos\theta \sin(\pi/4)\}$$

$$v3(\theta) = (1/4) \times \{1 - \sin\theta \sin(\pi/4) + \cos\theta \sin(\pi/4)\}$$

$$v4(\theta) = (1/4) \times \{1 - \sin\theta \sin(\pi/4) - \cos\theta \sin(\pi/4)\} \quad (1)$$

$v1(\theta)$ to $v4(\theta)$ represent the values of mutual proportions (vibration intensity ratios), the sum of which is 1. In practice, values obtained by multiplying the respective values of $v1(\theta)$ to $v4(\theta)$ by a common coefficient may also be used.

It is known that the intensity of vibration and the intensity perceived by a human for the vibration have a logarithmic relationship rather than a linear relationship. Therefore, such V1 that satisfies v1(θ)=log(V1) may also be used. This also applies to v2(θ), v3(θ), and v4(θ).

Figure 4:
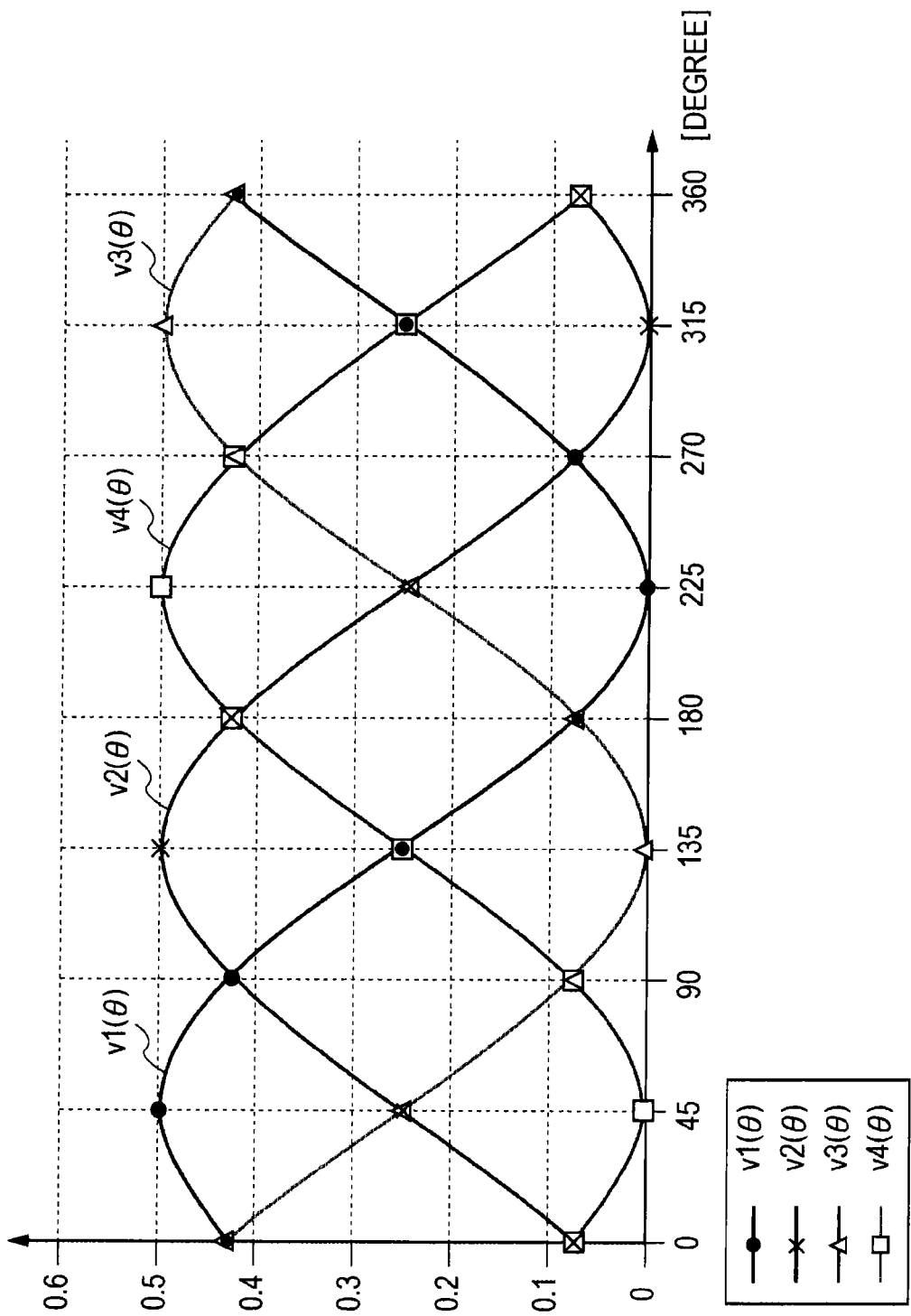
FIG. 4 is a graph showing v1(θ) to v4(θ) represented by Formula 1 in the embodiment of the present invention.

FIG. 4 is a graph showing v1(θ) to v4(θ) represented by Formula 1. The horizontal axis represents the angle θ, and the vertical axis represents the magnitude of each of v1(θ) to v4(θ). The angle θ has a range of 0 degrees to 360 degrees.

Figure 5:
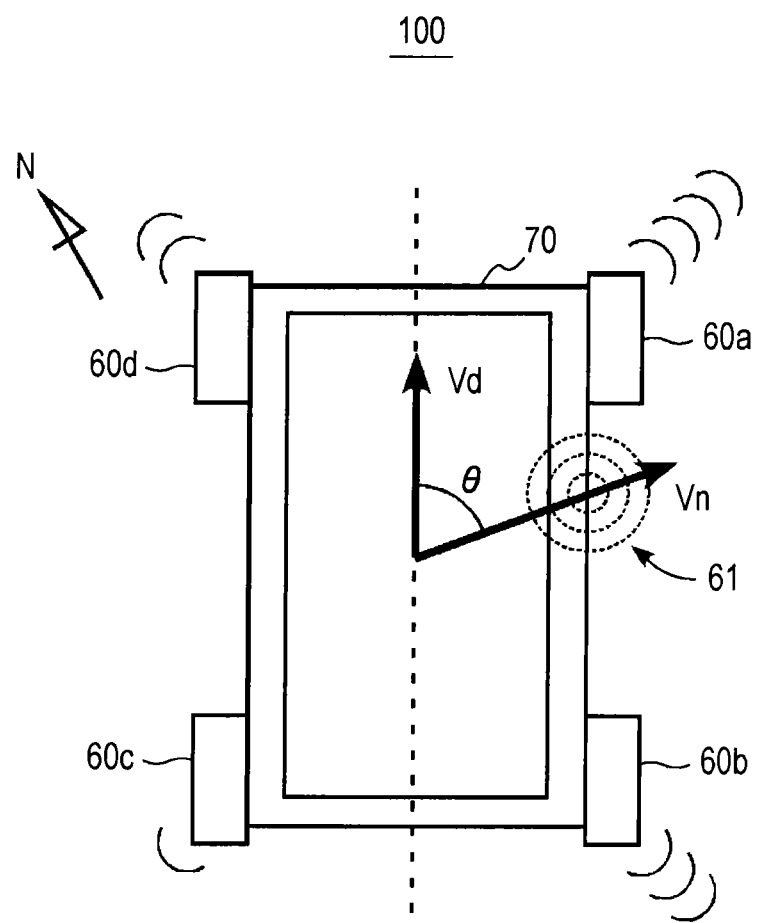
FIG. 5 illustrates the relationship among the angular difference θ, the vibration intensity ratios of respective vibration elements, and the position of a vibration PS.

By controlling the four vibration elements 60a to 60d on the basis of v1(θ) to v4(θ), respectively, in this way, a vibration PS 61 induced by the vibration elements 60a to 60d is obtained as shown in FIG. 5. The position of the vibration PS 61, which is obtained as a result of blending vibrations of all the vibration elements 60a to 60d, is sensed by the user. That is, the vibration PS 61 is recognized in the palm of the user holding the portable terminal as if only a single vibration element existed at a position depending on the respective vibration intensities of the four vibration elements 60a to 60d.

In the case where the travel direction is changed or the orientation of the terminal is changed with the user holding the terminal, or in the case where the destination direction is changed as the travel progresses, the angular difference θ is also changed. As a result, the proportions of the vibration intensities of the four vibration elements 60a to 60d are changed to move the position of the vibration PS to a position indicating the destination direction in the palm of the user. This allows the user to recognize the destination direction through tactile sensation without resorting to visual sensation.

Figure 6:
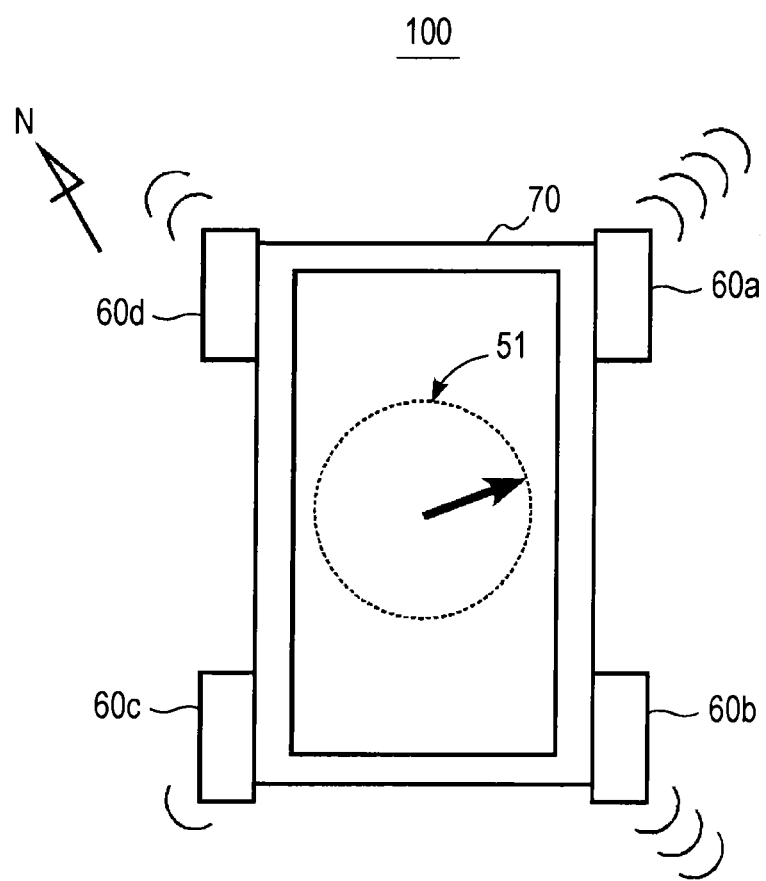
FIG. 6 shows exemplary screen display in the embodiment of the present invention.

Since the destination direction is presented to the user through the vibration PS as described above, display on the display screen is not necessary. However, screen display 51 as shown in FIG. 6, for example, may be made for confirmation. In the example, an arrow indicating the destination direction Vn is displayed with the substantial center of the screen as the base point. The terminal direction Vd is the direction toward the upper portion of the terminal in the longitudinal direction. The screen display 51 is not limited to such arrow display.

Because map display is not necessary in the present invention, map display is not performed at this point. However, the present invention does not exclude displaying a map centered on the current position in the background of the arrow for confirmation.

A process executed by the processing section 10 which governs an operation of the portable terminal according to the embodiment will be described with reference to FIGS. 7 to 12.

Figure 7:
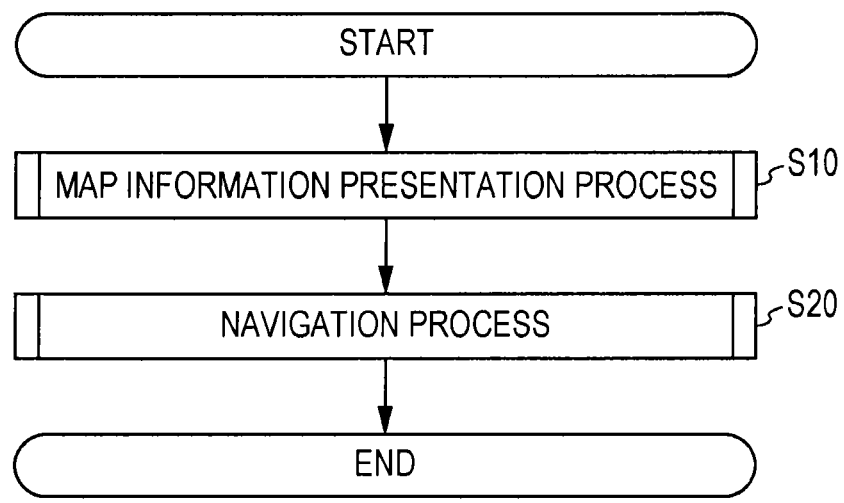
FIG. 7 is a flowchart showing the outline of a process performed by the portable terminal in the embodiment of the present invention.

As shown in FIG. 7, the process performed by the processing section 10 according to the embodiment roughly includes a map information presentation process S10 and a navigation process S20.

The map information presentation process S10 is executed by the map information presentation processing section 11. In the case where the user performs a navigation start operation, map information is extracted from the map DB and displayed on the screen to be presented to the user for determination of a destination position. In addition, information on the destination position determined by the user is temporarily stored in the memory.

The navigation process S20 is executed by the destination direction vector calculating section 12, the angular difference calculating section 13, and the vibration control section 14. Specifically, the navigation process S20 is a sequence of processes performed until a vibration output process is performed on the basis of the destination position information stored in the map information presentation process S10.

Figure 8:
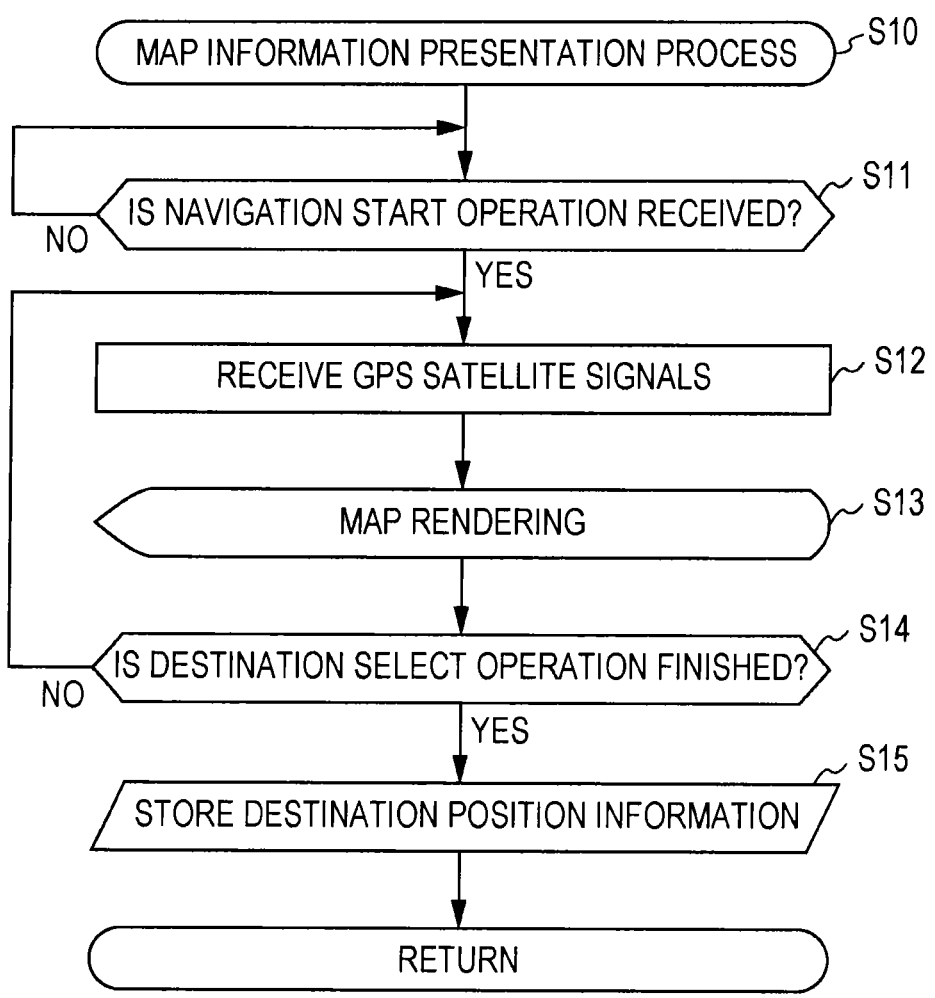
FIG. 8 is a flowchart showing a specific process example of a map information presentation process (S10) shown in FIG. 7.

FIG. 8 is a flowchart showing a specific process example of the map information presentation process (S10).

First, the process waits for the user to perform a navigation start operation using the operation section 36 (S11). Next, the GPS reception section 21 receives GPS satellite signals to detect the current position (the latitude and the longitude of the current position) on the basis of the GPS satellite signals (S12).

Next, map rendering is performed to extract information on a map centered on the vicinity of the current position from the map DB and display the map information on the screen (S13). The process accepts a destination select operation for the thus presented map, including updating, scrolling, rescaling, and so forth of a map area, performed by the user using the operation section 36 (S14). The processing section 10 acquires new map information again or performs map rendering again as necessary on the basis of the destination select operation.

When the destination select operation is finished, the destination position information is stored in the memory (S15). Thereafter, the process returns to the process of FIG. 7 to proceed to the next step S20.

Figure 9:
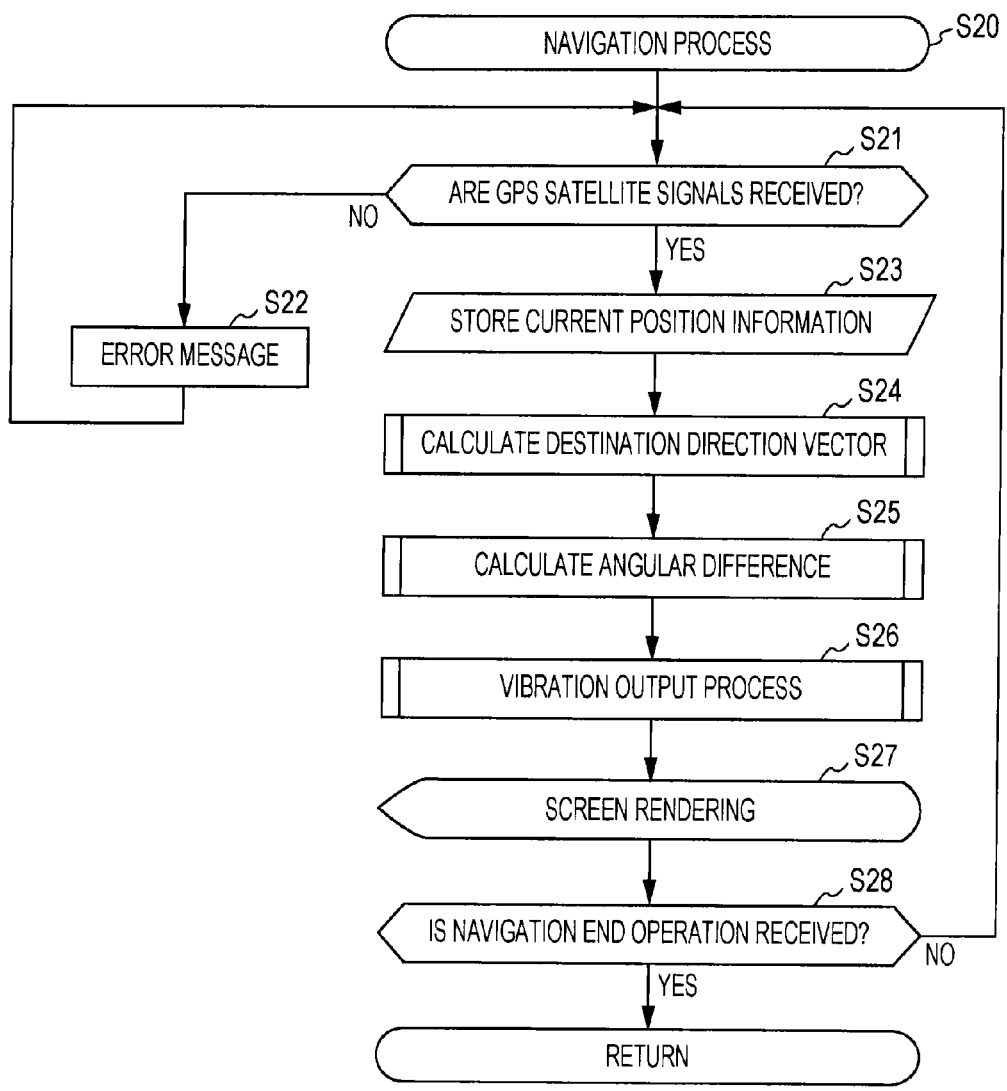
FIG. 9 is a flowchart showing a specific process example of a navigation process (S20) shown in FIG. 7.

FIG. 9 is a flowchart showing a specific process example of the navigation process (S20).

First, it is determined whether the GPS reception section 21 can currently receive GPS satellite signals (S21). If GPS satellite signals are not received, a predetermined error message is output through screen display, voice, or sound (S22), and it is attempted to receive GPS satellite signals again.

If GPS satellite signals are received, information on the current position is acquired on the basis of the GPS satellite signals to temporarily store the current position information in the memory (S23).

Thereafter, a destination direction vector calculating process (S24), an angular difference calculating process (S25), and a vibration output process (S26) are executed. The processes will be discussed in detail later.

Next, screen rendering is performed to present the screen display 51, such as the arrow discussed above, indicating the destination direction (S27). The rendering may also include turn-by-turn instructions along a multi-segmented path, such that the destination directional vector may initially point to one waypoint (e.g., a first turn), and then change to a different direction once the user has arrived at that first turn. This may be particularly useful when the user is walking on a city street, where certain predetermined paths, such as sidewalks, must be followed.

The process returns to step S21 to repeatedly execute the processes discussed above until a navigation end operation is performed (S28). The position of the vibration PS is updated in the cycle of repetition. For example, if the cycle of repetition of the processes of steps S21 and S23 to S27 is set to be short, changes in destination direction may be presented substantially continuously.

Figure 10:
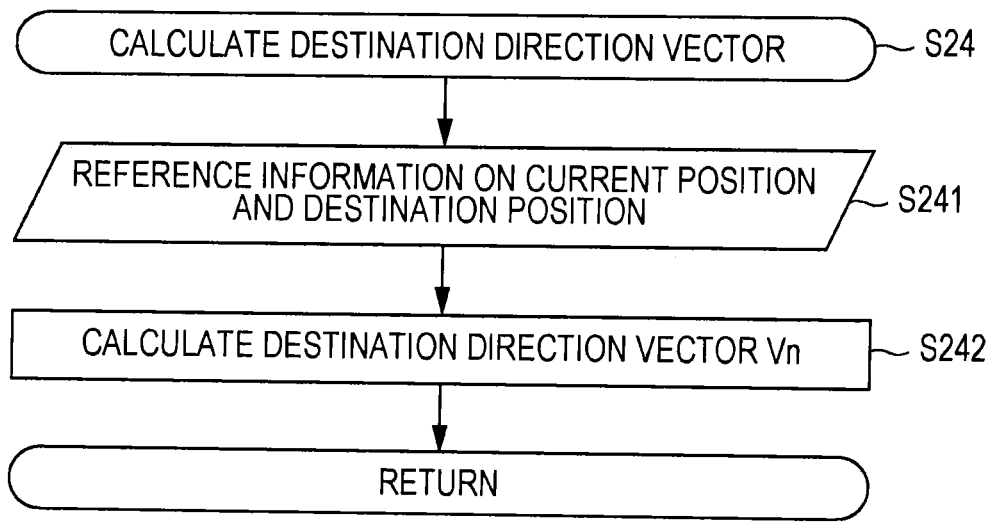
FIG. 10 is a flowchart showing a specific process example of a destination direction vector calculating process (S24) shown in FIG. 9.

FIG. 10 is a flowchart showing a specific process example of the destination direction vector calculating process (S24). The process is conducted by the destination direction vector calculating section 12.

First, the information on the current position and the destination position stored in the memory is referenced (S241). Next, the current position and the destination position stored in the above steps S23 and S15, respectively, are referenced to calculate the destination direction vector Vn on the basis of the current and destination positions (S242).

Figure 11:
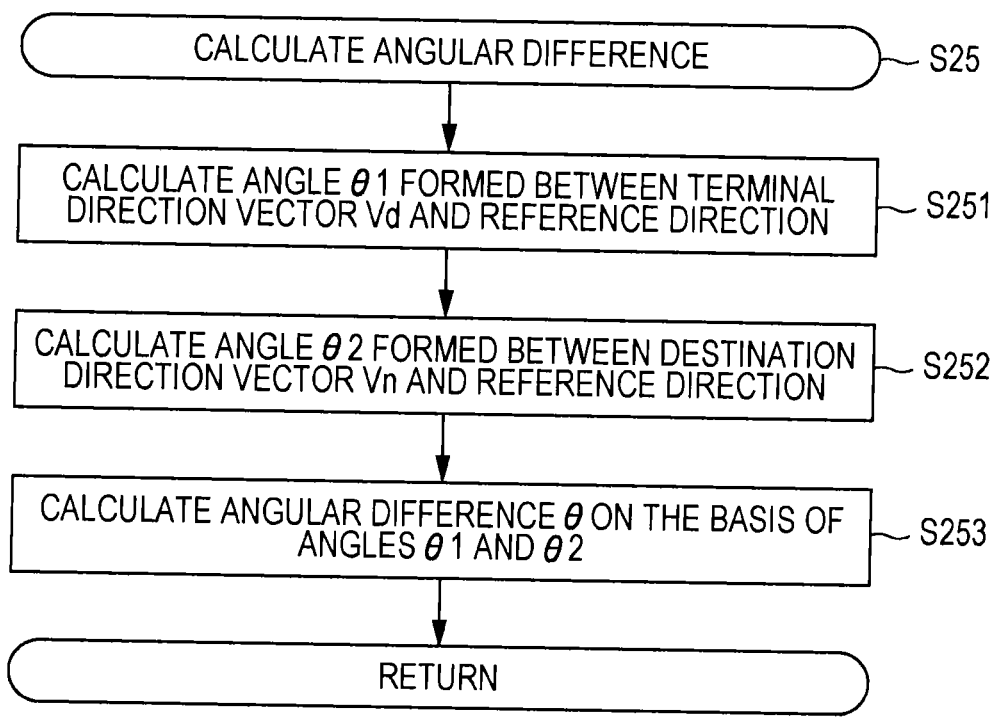
FIG. 11 is a flowchart showing a specific process example of an angular difference calculating process (S25) shown in FIG. 9.

FIG. 11 is a flowchart showing a specific process example of the angular difference calculating process (S25). The process is conducted by the angular difference calculating section 13.

First, the angle θ1 formed between the terminal direction vector Vd indicating the direction of the terminal and the reference direction is calculated on the basis of the output of the terrestrial magnetism sensor 31 (S251).

Next, the angle θ2 formed between the destination direction vector Vn and the reference direction is calculated (S252). Further, the angular difference θ between the angles θ1 and θ2 is calculated (S253).

Figure 12:
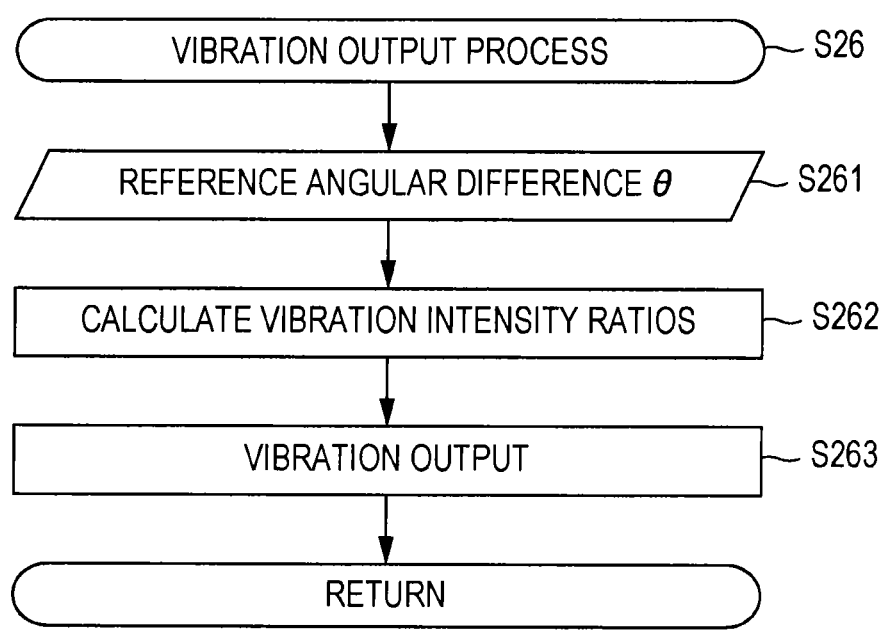
FIG. 12 is a flowchart showing a specific process example of a vibration output process (S26) shown in FIG. 9.

FIG. 12 is a flowchart showing a specific process example of the vibration output process (S26). The process is conducted by the vibration control section 14.

First, the angular difference θ calculated in step S253 is referenced (S261). Next, the vibration intensity ratios of the four vibration elements are calculated on the basis of the angular difference θ using Formula (1) above (S262). Then, the four vibration elements are driven on the basis of the vibration intensity ratios (S263).

Figure 13:
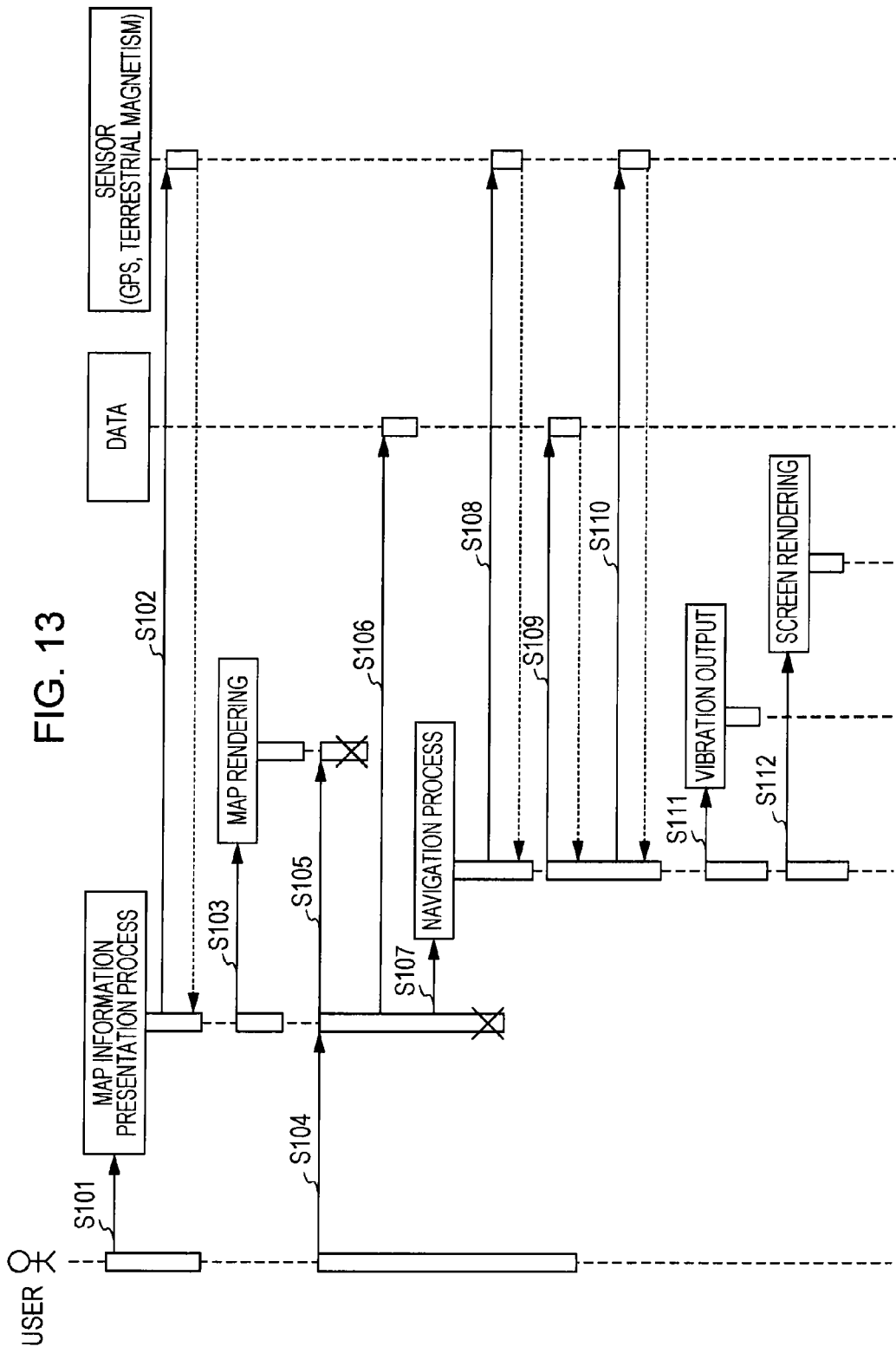
FIG. 13 is a sequence diagram showing an overall operation example of a navigation system according to the embodiment of the present invention.

FIG. 13 is a sequence diagram showing an overall operation example of such a navigation system.

When the user performs a navigation start operation for the portable terminal (S101), the map information presentation process is started in the portable terminal.

Then, the portable terminal receives GPS satellite signals (S102), and references the current position detecting section 20 for the current position information.

Next, the map information presentation process is performed to start map rendering using the map DB (S103) so that a map is displayed on the screen.

Further, in response to the completion of a destination select operation performed by the user (S104), display of the map information is finished, and the destination position information is stored (S106).

Thereafter, the navigation process is started (S107).

In the navigation process, first, the current position information obtained by the current position detecting section 20 is referenced (S108). Next, the destination position information stored earlier is referenced (S109).

Then, the terminal direction vector Vd is confirmed by the terminal direction detecting section 30 on the basis of the output of the terrestrial magnetism sensor (S110).

As a result of the processes, the vibration intensity ratios of the four vibration elements are calculated on the basis of the destination direction vector Vn, which is based on the destination position information and the current position information, and the terminal direction vector Vd to drive the vibration elements through the vibration output process in accordance with the vibration intensity ratios (S111).

Along with the driving of the vibration elements, the destination direction based on the current position of the portable terminal 100 is visually displayed through screen rendering using the arrow described above, for example (S112).

In the above description, the frequency of the vibration section 60 is constant. However, the frequency of the vibration section 60 may be variable in accordance with the circumstances. For example, the characteristics of vibration may be varied in accordance with the distance between the current position and the destination position.

Figure 14:
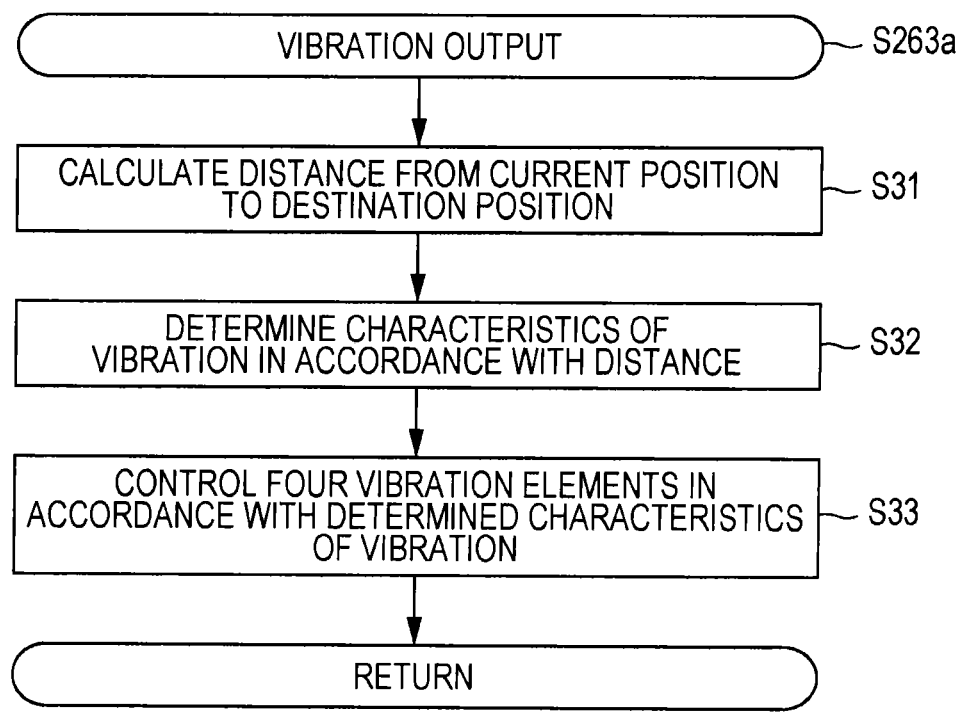
FIG. 14 is a flowchart showing a process example of a vibration output process (S263a) as a modification of the vibration output process (S263) shown in FIG. 12.

FIG. 14 shows a process example of a vibration output process (S263*a*) which is a modification of the vibration output process (S263) described above. In the modification, the destination direction vector calculating section 12 also serves as a distance calculating section that calculates the distance between the current position and the destination position.

First, the distance from the current position to the destination position is calculated (S31). Next, the characteristics of vibration of the vibration section 60 (vibration elements 60*a* to 60*d*) are determined in accordance with the distance (S32).

In this case, the distance may be classified into a plurality of ranges (for example, a short distance, a middle distance, and a long distance), and the characteristics of vibration may be varied in accordance with which of the ranges the calculated distance belongs to. The number of the plurality of ranges is at least two or more. The characteristics of vibration may be at least one of the frequency of vibration, the interruption frequency of vibration, the interruption pattern, and the intensity of vibration.

The four vibration elements are controlled in accordance with the characteristics of vibration determined in step S32 (S33).

The vibration frequency may be modified by lowering the frequency as the distance becomes shorter, for example.

The interruption frequency of vibration is the frequency of repeated cycles each including a vibration period and a rest period. That is, in the case where an interruption pattern including m seconds (for example, 0.5 seconds) of vibration and n seconds (for example, 0.5 seconds) of rest is repeated, the interruption frequency is defined as (m+n) seconds. The interruption frequency of vibration may be modified in accordance with the distance by lowering the interruption frequency as the distance to the destination becomes shorter, for example.

Modifying the interruption pattern means that patterns that are different in combination of the lengths of the vibration period and the rest period described above are switchably used. The interruption pattern may be modified in accordance with the distance by using such a pattern that gives the user a greater sense of urgency as the distance becomes shorter, for example.

The intensity of vibration, as the characteristics of vibration, is equivalent to a coefficient by which the vibration intensity ratios of the four vibration elements described above are commonly multiplied. In the present invention, the vibration period is obtained by multiplying the vibration intensity ratio by the coefficient, and the final intensity of vibration is varied by the proportion of the vibration period and the rest period. However, the method for varying the intensity of vibration is not limited thereto. The intensity of vibration may be modified in accordance with the distance by increasing the coefficient as the distance to the destination becomes shorter, for example, thereby increasing the intensity of vibration.

According to the embodiment, as has been described above, it is possible not only to recognize information on whether or not the terminal direction matches the destination direction, but also to recognize the destination direction through vibration even if the terminal direction and the destination direction do not coincide with each other. In addition, the system is capable of continuously presenting the destination direction to the user.

Recognition of the destination direction through vibration according to the present invention prevents distraction of attention to the surroundings due to exploration for the destination direction, which enables safer assistance in arriving at the destination. As an alternatively embodiment, the vibration elements may be replaced by, or complemented by other tactile active elements such as heating elements, constrictive elements or electrical stimulation elements, each of which impart controllable levels of tactile sensation. The heating elements are electric-current sensitive and generate heat in distributed fashion so as to direct the user in a particular direction. For example, the user can perceive heat two elements as generating substantially more heat than the other two elements, and a ratio between the amount of perceived heat from the elements provides a tactile clue to the user regarding the orientation of the destination direction vector Vn. As another embodiment, the destination direction vector Vn may be perceived by the user, who is wearing a glove, or other garment with pressure restrictive transducers, that "squeeze" or "tingle" respective fingers, wrist, etc. as a tactile clue regarding the intended navigation direction. A glove such as that described in U.S. Pat. No. 5,067,478, the entire contents of which being incorporated herein by reference, may readily be adapted to assist in this function.

Compared to the system disclosed in PTL 4, in which the control device for the actuator itself may be complicated, the system according to the present invention is simple in device structure, and can be used easily.

If no map is displayed after the destination is determined, the load and the time necessary for the map information acquisition and display processes may be reduced.

While a preferred embodiment of the present invention has been described above, various changes and modifications other than those mentioned above can be made.

For example, in the case where the frequency, intensity, and pattern of vibration are fixed, the user may be allowed to variably set the frequency, intensity, and pattern of vibration.

In the above description, the vibration PS is controlled by controlling vibrations at four points using four vibration elements. However, the vibration PS can be controlled by controlling vibrations at more or less than four points by modifying the calculation algorithm (calculation formula) for the vibration intensity ratios. In the case of vibrations at three points, some constraints such as the difficulty in controlling the vibration PS due to the smaller number of vibration elements and the difficulty in disposing the vibration elements efficiently in terms of functionality and design may be posed. However, by disposing the vibration elements at the positions of the vertexes of a triangular shape and modifying the calculation algorithm, it is possible to present information on a direction on a two-dimensional plane as in the case where vibrations at four points are used. In this case, the effect of the present invention is still obtained although the precision and the efficiency are slightly degraded.

REFERENCE SIGNS LIST

10: processing section
11: map information presentation processing section
12: destination direction vector calculating section
13: angular difference calculating section
14: vibration control section
20: current position detecting section
21: GPS reception section
30: terminal direction detecting section
31: terrestrial magnetism sensor
35: input section
36: operation section
40: map DB/destination position detecting section
41: communication section
50: display section
51: screen display
60: vibration section
60a, 60b, 60c, 60d: vibration element
70: housing
100: portable terminal

The invention claimed is:

1. A portable navigation device comprising:
a housing having a substantially rectangular shape;
a first active element disposed at one corner of the housing;
a second active element disposed at a second corner of the housing;
a third active element disposed at a third corner of the housing;
a fourth active element disposed at a fourth corner of the housing;
a position detecting section that detects a current position;
an input section that receives an input for specifying a destination;
a destination direction detecting section that detects a destination direction to the destination from the current position;
a terminal direction detecting section that detects a terminal direction of the housing;
an angular difference calculating section that calculates an angular difference between the destination direction and the terminal direction; and
an active element control section that determines respective tactile sensation intensities of each of the first, second, third and fourth active elements based on the angular difference to control each of the first, second, third and fourth active elements in accordance with the tactile sensation intensities, wherein the active element control section controls at least three of the first, second, third and fourth active elements to simultaneously be activated at non-zero intensities based on the angular difference.

2. The portable navigation device of claim 1, wherein
said first, second, third and fourth active elements are vibration elements, and
said active element control section is a vibration control section that determines respective vibration intensities of each of the first, second, third and fourth vibration elements to control each of the first, second, third and fourth vibration elements in accordance with the vibration intensities.

3. The portable navigation device of claim 2, further comprising:
a distance calculating section that calculates a distance between the current position and the destination position, wherein
the vibration control section varies attributes of each of the first, second, third and fourth vibration elements based on the calculated distance.

4. The portable navigation device of claim 2, further comprising:
a display section that displays a map for inputting the destination.

5. The portable navigation device of claim 4, wherein
said display section displays the destination direction.

6. The portable navigation device of claim 2, wherein
said input section sets said destination as an initial waypoint along a segment of a multi-segmented path.

7. The portable navigation device of claim 6, wherein
said destination direction detecting section changes said destination direction at different turns along said multi-segmented path so as to provide turn-by-turn vibrational instructions to traverse said multi-segmented path.

8. The portable navigation device of claim 2, wherein
said first, second, third and fourth vibrational elements are disposed about said housing such that when said housing is grasped the respective vibration intensities of the first, second, third and fourth vibration elements impart a phantom sensation to a user.

9. The portable navigation device of claim 2, wherein
said vibration control section causes said phantom sensation to be aligned with said destination direction.

10. The portable navigation device of claim 2, wherein
said housing being a mobile telephone housing.

11. The portable navigation device of claim 1, wherein
said first, second, third and fourth active elements include at least one of a heating element, a constrictive element, and an electrical stimulation element.

12. The portable navigation device of claim 2, wherein
said angular difference calculating section calculates
an angle θ1 between the terminal direction and a reference direction,
and angle θ2 between the destination direction and the reference direction, and
calculates the angular difference θ based on angle θ1 and angle θ2.

13. The portable navigation device of claim 2, wherein
said vibration control section calculates vibration intensity ratios between respective of the first, second, third and fourth vibration elements as part of determining said respective vibration intensities.

14. The portable navigation device of claim 2, wherein
said first, second, third and fourth vibration elements consist essentially of four vibration elements.

15. A tactile sensory navigation method comprising:
detecting a current position of a portable navigation device with a position detecting section of said portable navigation device;
receiving an input for specifying a destination;
detecting a destination direction to the destination from the current position;
detecting a terminal direction of the portable navigation device, said portable navigation device including first, second, third and fourth active elements disposed at different corners of a substantially rectangular-shaped housing of the portable navigation device;
calculating with a processor an angular difference between the destination direction and the terminal direction;
determining with an active element control section respective tactile sensation intensities of each of the first, second, third and fourth active elements on the basis of the angular difference; and
driving at least three active elements in accordance with the determined tactile sensation intensities such that at least three of the first, second, third and fourth active elements are simultaneously be activated at non-zero intensities based on the angular difference.

16. The method of claim 15, wherein
said first, second, third and fourth active elements are vibration elements,
said determining includes determining respective vibration intensities of each of the first, second, third and fourth vibration elements, and
said driving includes driving each of the first, second, third and fourth vibration elements in accordance with the respective vibration intensities.

17. The method of claim 16, further comprising:
calculating with the processor a distance between the current position and the destination position, wherein
said driving varies attributes of each of the first, second, third and fourth vibration elements based on the distance calculated by the processor.

18. The method of claim 16, further comprising:
displaying a map on a display of the portable navigation device for inputting the destination.

19. The method of claim 18, wherein
said displaying includes displaying the destination direction.

20. The method of claim 15, further comprising
setting said destination as an initial waypoint along a first segment of a multi-segmented path.

21. The portable navigation device of claim 12, wherein
said active element control section calculates the respective vibration intensities $v1(\theta)$, $v2(\theta)$, $v3(\theta)$ and $v4(\theta)$ of the first, second, third and fourth vibration elements using the angular difference θ by the following equations:

$$v1(\theta)=(\tfrac{1}{4})\times\{1+\sin\theta\sin(\pi/4)+\cos\theta\sin(\pi/4)\}$$

$$v2(\theta)=(\tfrac{1}{4})\times\{1+\sin\theta\sin(\pi/4)-\cos\theta\sin(\pi/4)\}$$

$$v3(\theta)=(\tfrac{1}{4})\times\{1-\sin\theta\sin(\pi/4)+\cos\theta\sin(\pi/4)\}$$

$$v4(\theta)=(\tfrac{1}{4})\times\{1-\sin\theta\sin(\pi/4)-\cos\theta\sin(\pi/4)\},$$
wherein $v1(\theta)$ to $v4(\theta)$ represent values of mutual proportions, a sum of which is 1.

* * * * *